United States Patent [19]

Pasley

[11] 4,137,681
[45] Feb. 6, 1979

[54] FASTENING DEVICE FOR SECURING WEAR-RESISTANT TILES TO A BACKING

[75] Inventor: Edward L. Pasley, Mexico, Mo.

[73] Assignee: A. P. Green Refractories Co., Mexico, Mo.

[21] Appl. No.: 839,802

[22] Filed: Oct. 6, 1977

[51] Int. Cl.² ................. E04B 1/40; E02D 35/00
[52] U.S. Cl. ................................. 52/127; 52/506; 29/455 R; 228/140; 228/165
[58] Field of Search ............... 52/127, 506, 334, 122, 52/513; 85/45; 29/455 R, 526; 228/140, 165; 219/98, 99, 139 R

[56] References Cited

U.S. PATENT DOCUMENTS

| 1,986,014 | 1/1935 | Rippen | 52/506 |
|---|---|---|---|
| 3,354,913 | 11/1967 | Goto | 138/147 |
| 3,434,262 | 3/1969 | Lawrence | 29/455 R |
| 3,624,344 | 11/1971 | Kutzer | 52/506 |
| 3,687,093 | 8/1972 | Byrd | 52/506 |
| 3,702,024 | 11/1972 | Baker | 29/455 R |
| 3,821,975 | 7/1974 | Haker | 85/45 |

Primary Examiner—James L. Ridgill, Jr.
Attorney, Agent, or Firm—Gravely, Lieder & Woodruff

[57] ABSTRACT

A tile which forms part of a wear-resistant lining that covers a metal backing has a tapered hole and is held against the backing by a fastening device which fits into the tapered hole. The fastening device includes a threaded element that projects from the backing into the hole and an anchor that threads over the threaded element. The anchor fits completely within the tapered hole and has a tapered side wall, the taper of which corresponds to that of the hole.

13 Claims, 8 Drawing Figures

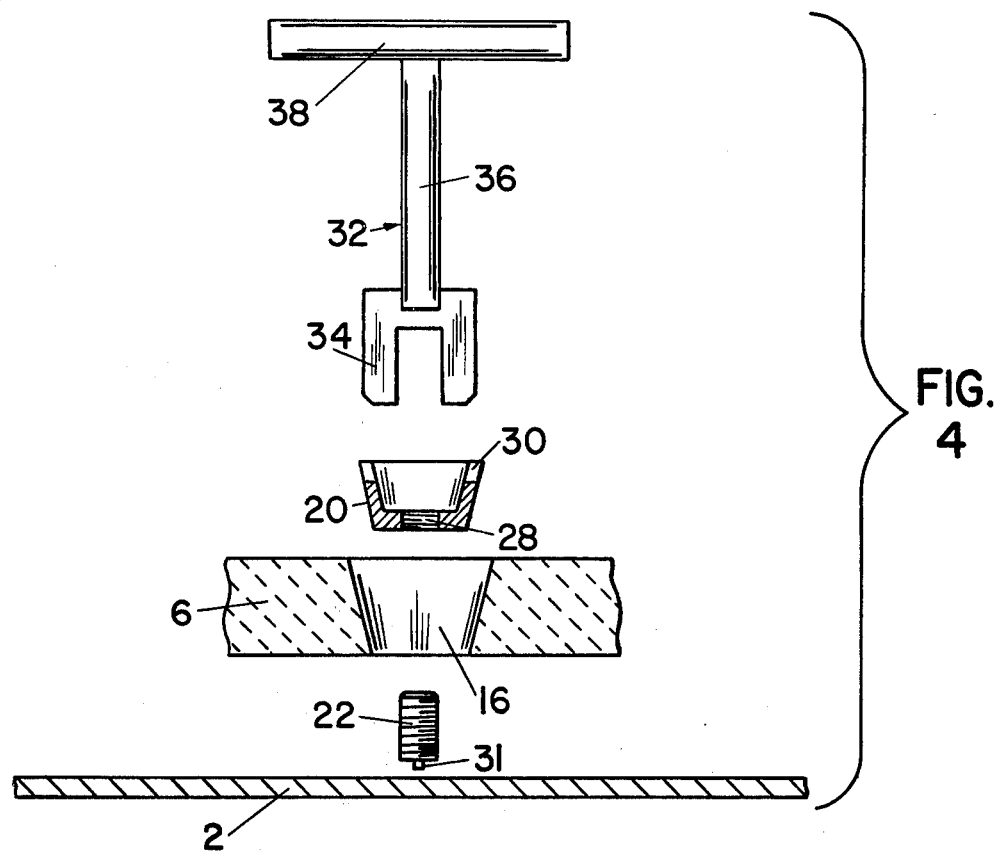
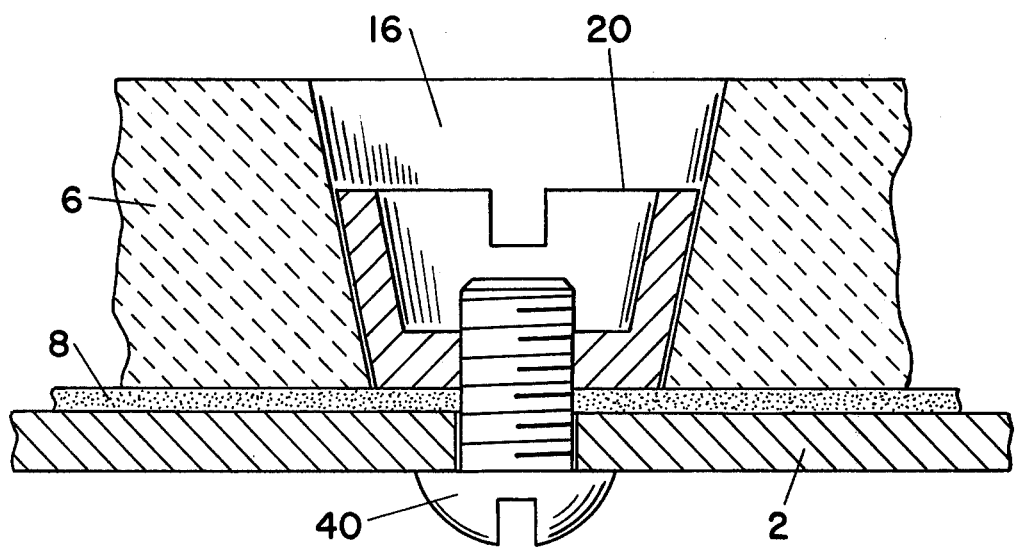

FASTENING DEVICE FOR SECURING WEAR-RESISTANT TILES TO A BACKING

BACKGROUND OF THE INVENTION

This invention relates in general to fastening devices and, more particularly, to fastening devices for attaching liner segments to a backing.

Chutes and other conduits through which abrasive materials are conveyed wear out quite rapidly unless protected against the abrasive action of the materials. For this reason such conduits are often comprise a metal shell lined with hard refractory materials such as aluminum oxide.

One procedure for achieving this end is to install the refractory tiles against the shell of the conduit by means of tapered plugs. Each tile has at least one tapered hole into which a tapered plug fits. When the plug is fully inserted, it is completely recessed within the tile and has its inner end located near the metal shell. The inner end furthermore has an aperture through which the metal shell is exposed. The plug is secured to the shell merely by inserting a welding rod through the aperture and striking an arc with the metal shell so as to produce a bead between the inner end of the plug and the shell. This procedure is disclosed in U.S. Pat. Nos. 3,624,344 and 3,747,291.

While the tiles may be flat, the conduit shells against which they are installed often are not, and as a consequence the individual tiles must often be set into a grout bed to level them. This displaces the plugs from the shell, making it difficult to build a bead between the two. Also, most plugs merely fit loosely into their tapered holes, so it is difficult to maintain them tightly seated as they are welded to the shell. Furthermore, replacement of the tiles on an individual basis is not an easy undertaking, for it requires cumbersome arc welding equipment.

SUMMARY OF THE INVENTION

One of the principal objects of the present invention is to provide a fastening device for holding a lining securely against a backing. Another object is to provide a fastening device of the type stated which is suited for use with tiles leveled by a grout bed. A further object is to provide a fastening device of the type stated which accommodates for variations in the thickness of the grout bed behind the tiles. An additional object is to provide a fastening device of the type stated which includes a tapered anchor that is threaded over a stud projected from the backing so that it may be run down and securely seated against the tile that it secures in place. Still another object is to provide an anchor which is easily removed, so that the tiles may be easily replaced on an individual basis. These and other objects and advantages will become apparent hereinafter.

The present invention is embodied in a fastening device including an anchor and a threaded element over which the anchor threads. The threaded element projects from a backing into a tapered hole in the lining that overlies the backing, and the anchor threads down over the element and into the hole so as to hold the lining in place against the backing. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

FIG. 4 is an exploded elevational view showing the backing, the threaded stud of the fastening device, the tile, the anchor of the fastening device, and the tool for installing the anchor;

FIG. 5 is a sectional view of a modified fastening device;

DETAILED DESCRIPTION

Figure 1:
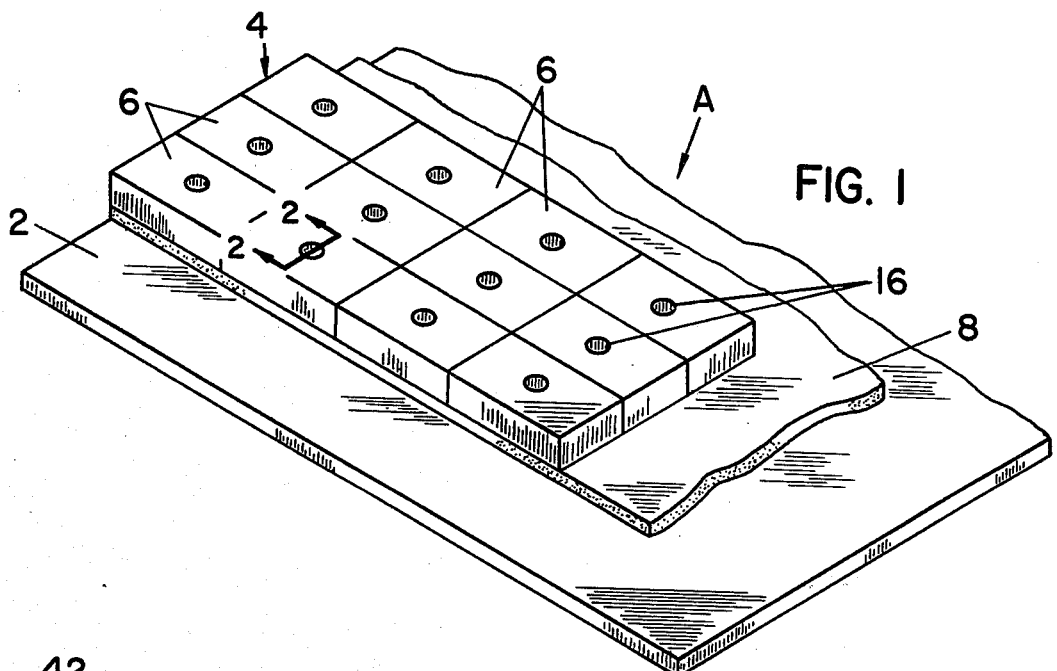
FIG. 1 is a perspective view, partially broken away and in section, of a backing lined with tiles which are secured by fastening devices of the present invention.

Referring now to the drawings, A designates a chute conduit, or other structure through which an abrasive material passes (FIG 1). This substance may be a slurry containing abrasive particles, an airstream having abrasive particles entrained in it, or merely the abrasive particles themselves. The structure A includes a metal shell or backing 2 and a wear resistant lining 4 that covers the backing 2 and prevents the abrasive material from coming against it. The backing 2 supports the lining 4 and maintains it in the desired configuration. The lining 4 is formed from wear resistant segments or tiles 6 which are set edge-to-edge over the entire surface area of the structure A that is exposed to the abrasive material. The tiles 6 may be set into a grout bed 8 to level them, particularly if the backing 2 does not provide a level surface against which the tiles 6 may be positioned. Each tile 6 is retained in place by a fastening device 10, that is in turn attached directly to the backing 2.

Each tile 6 is formed from a hard wear resistant material which is preferably a molded and fired ceramic such as aluminum oxide. While most tiles 6 are rectangular, the exact configuration is not critical. The important factor is that the configuration of the tiles 6 enables them to be set edge-to-edge over the backing 2 so that the lining is for all intents and purposes continuous and provides complete protection for the backing 2. Each tile 6 has a back face 12 (FIG. 2) which is presented toward the backing 2 and a front face 14 that is exposed to the abrasive material. Each also is provided with at least one tapered hole 16 which is larger at the front face 14 than at the back face 12.

The hole 16 is circular in cross section so that its overall configuration is that of a frustum of a cone. Thus when the tile 6 is placed against the backing 2, a portion of the backing 2 is exposed through the hole 16. Of course, if the tile 6 is set into a grout bed 8, the portion of the bed 8 at the hole 16 must be cleared away to expose the metal surface of the backing 2.

A separate fastening device 10 (FIGS. 2 & 3) exists for each tile 6, and that fastening device fits into the tapered hole 16 for the tile 6. Each fastening device 10 includes a tapered anchor 20 and a threaded stud 22. The former fits into the tapered hole 16 and prevents withdrawl of the tile 6, while the latter is secured to the backing 2. The anchor 20 threads over the stud 22, and can thus be run down until it is seated tightly against the tile 6 at the hole 16. To this end, the anchor 20 has a tapered side wall 24 of uniform thickness, and a flat end wall 26 which if formed integral with the side wall 24 at the small end thereof, the end wall 26 being squared off with respect to the axis of the anchor 20. As a consequence, the anchor 20 has a hollow interior or socket 27 which opens outwardly at the large diameter end thereof. The taper of the side wall 24 corresponds to that of the tapered hole 16, while the diameter of the end wall 26 is about equal to that of hole 16 at its small diameter end. Consequently the anchor 20 will fit into the hole 16 until its end wall 26 is at about the back face 12, in which case side wall 24 seats against the tapered surface of the hole 16. The height of the anchor 20 is somewhat less than the depth of the hole 16, which of course corresponds to the thickness of the tile 6. The end wall of the anchor 20 is provided with a threaded aperture 28 which is centered therein so as to be concentric to the axis of the anchor 20 and is accessible through the socket 27. The aperture 28 is sized to receive the threaded stud 22. The large diameter end of the tapered side wall 24 has two slots 30 which open outwardly therefrom and are diametrically opposed to each other.

The stud 22 is welded to the metal backing 2 by stud welding procedures. Initially it has a small nib 31 (FIG. 4) at its end. To secure the stud 22 in place, the stud 22 is positioned perpendicular to the backing with the nib 31 forced tightly against the backing 2. Then a large surge of current is passed through the stud and backing, causing the nib 31, which is the region of greatest resistance, the melt and weld the stud 22 to the backing 2. The studs 22 may be welded in place either before or after the tiles are set against the backing 2.

In any event, once the stud 22 is in place and the tile 6 for that stud is set, the stud 22 will project axially through the center of the tapered hole 16. Next the anchor 20 is threaded over the stud 22 and turned down until its side wall 24 seats against the tapered surface of the tapered hole 16.

Since the anchor 20 is somewhat inaccessible within the hole 16, an installation tool 32 (FIG. 4) may be used for turning it. The tool 32 possesses a U-shaped blade 34, the width of which is less than the width of the tapered hole 16 at the location of the upper end of the side wall 24. The thickness of the blade 34, on the other hand, is slightly less than the breadth of the slots 30, so that when the blade 34 is inserted into the hole 16, the tines at its end will fit into the slots 30. The spacing between the tines exceeds the diameter the threaded stud 22 so that the stud 22 may be received in that space if necessary. In addition to the blade 34, the tool 32 includes a shank 36 which extends axially from the blade 34 and a handle 38 which is arranged perpendicular to the shank 36 at the outer end thereof. Thus, the blade 34 is inserted into the hole 16 and engaged with the anchor 20 at the slots 30 therein, and when so engaged the anchor 20 is easily rotated merely by turning the handle 38 from beyond the front face 14 of the tile 6.

The tile 6 may also be secured in place by inserting a machine screw 40 (FIG. 5) through the backing 2 and threading it into the aperture 28 of an anchor 20. The screw 40 is particularly suited as a substitute for the stud 22 if the latter breaks off without stud welding equipment being available to replace it.

Figure 2:
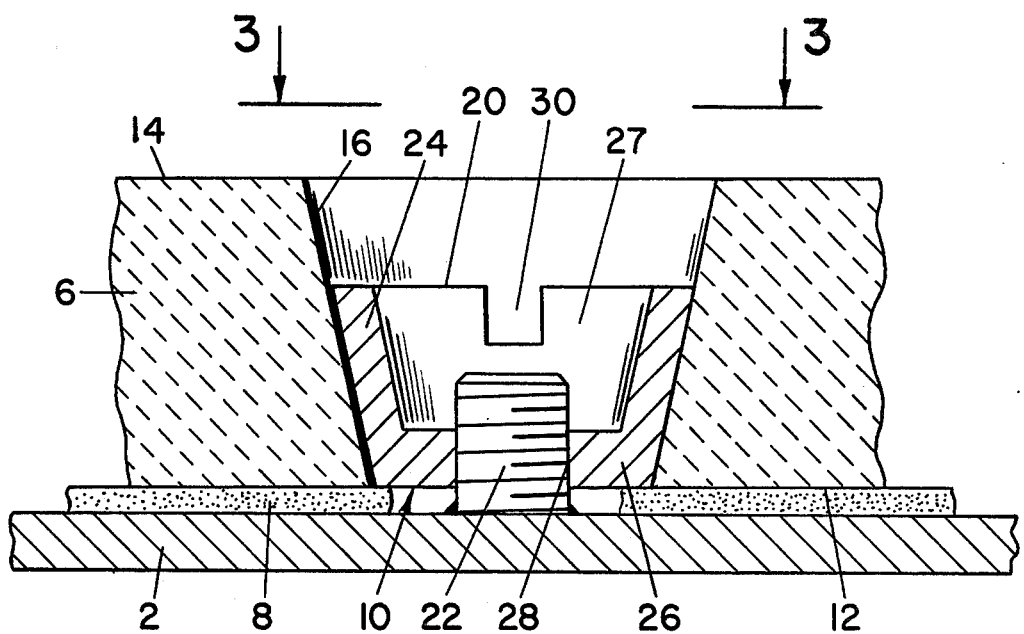
FIG. 2 is a sectional view taken along line 2—2 of FIG. 1 and showing the fastening device.
Figure 3:
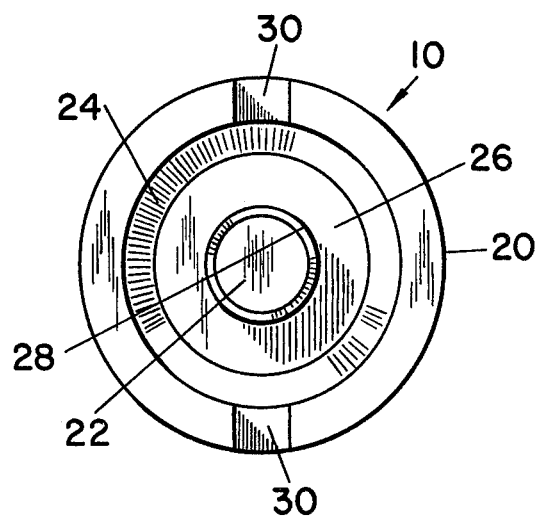
FIG. 3 is a plan view of the fastening device taken along line 3—3 of FIG. 2.

While the fastening devices 10 may be used to attach the tiles 6 directly against the backing 2, it is particularly suited for uses where the grout bed 8 is used between the tile 6 and the backing 2. In this regard, the grout bed 8 is employed where it is desired to level the tiles 6, and as a consequence, the bed 8 will vary in thickness from one tile 6 to another. Irrespective of the thickness of the bed, the anchor 20 is turned down over its threaded stud 22 until its tapered side wall 24 seats snugly into the tapered hole 16 (FIG. 2). This assures a firm and secure placement of the tile 6.

Also, the anchor 20 and the tile 6 in which it is located, may be secured to the backing by the conventional procedure, that is by welding the end wall 26 of the anchor 20 directly to the backing 2. In that case a welding rod is inserted through the threaded aperture and an arc is struck with the backing 2. The arc is maintained long enough to build a bead between the backing 2 and the end wall 26 of the anchor 20.

Figure 6:
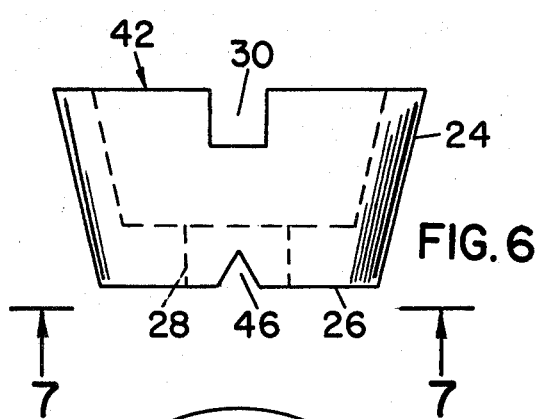
FIG. 6 is an elevational view of a modified anchor.
Figure 7:
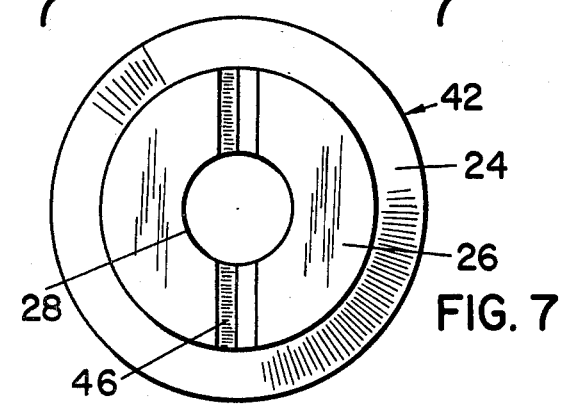
FIG. 7 is a bottom view of the modified anchor taken along line 7—7 of FIG. 6.
Figure 8:
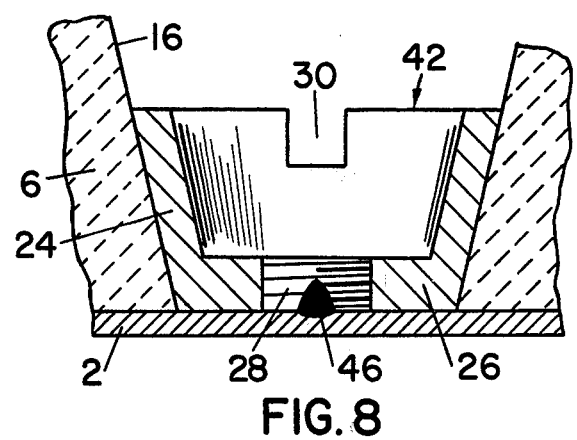
FIG. 8 is a sectional view of the modified anchor showing it welded to the backing and holding a tile in place.

A modified tapered anchor 42 (FIGS. 6-8) is particularly suited for attachment by welding. Like the anchor 20, the anchor 42 includes a tapered side wall 24, an end wall 26, a socket 27, a threaded aperture 28, and slots 30. Indeed, the modified anchor 42 is identical to the anchor 20 in every respect, except that it has a groove 44 extending transversely across its end wall 26. The groove 44 is V-shaped in cross section and opens toward the backing 2. It further bisects the fastening device 42, extending completely across the end wall 26. As such, it intersects the threaded aperture 28, the diameter of which is slightly greater than the maximum width of the groove 44.

The tapered anchor 42 can of course be attached to the metal backing 2 by means of a threaded stud 22 or a machine screw 40. It can also be attached by bringing its end wall 26 against or close to the backing 2 and inserting a welding rod through the aperture 28. Once an arc is struck with the backing 2, a pool of molten metal develops and this molten metal flows radially through the groove 44 toward the periphery of the end wall 26, thereby forming a bead 46 (FIG. 8) in the aperture 28 and groove 44. Enough weld metal is deposited from the rod to partially fill, but not overflow the threaded aperture 28. As a consequence, the anchor 42 is not only secured to the metal backing 2 at the aperture 28, but also along the groove 44, thus forming a more secure attachment.

While it is desirable to confine the holes 16 wholly within the tiles 6, so that each tile 6 has its own hole 16, it is also possible to produce the tiles 6 with arcs at their corners so that the arcs of the four tiles 6 that meet at any corner form a complete hole. In this case, the anchors 20 hold the tiles 6 at their corners instead of at their centers.

The large ends of the tapered holes 16 may be left open or they may be closed with a ceramic plug or a filler material such as epoxy.

This invention is intended to cover all changes and modifications of the example of the invention herein chosen for purposes of the disclosure which do not constitute departures from the spirit and scope of the invention.

What is claimed is:

1. An anchor for attaching a tile to a metal backing, the tile having a hole that tapers downwardly toward the backing, said anchor comprising: a tapered side wall and an end wall at the small end of the side wall, with the side wall being concentric to the axis of the anchor and surrounding a socket in the anchor and with the end wall extending across the end of the socket and having a generally flat front face that is generally perpendicular to the axis of the anchor, the side wall being narrow enough to fit into the large end of the tapered hole and to seat in the hole with the flat front face of the end wall close to the metal backing, the end wall having an aperture extended completely through it so that a welding rod can be passed through the socket and aperture and brought against the metal backing, the end wall further having a groove that extends partially into it and radiates from the aperture, the groove opening forwardly out of the flat front face of the end wall and toward the metal backing but not rearwardly toward the large end of the sidewall, whereby molten metal from the welding rod will flow outwardly away from the aperture.

2. An anchor according to claim 1 wherein the aperture is threaded so that the anchor can be secured to the metal backing either by welding or by a threaded element projected from the backing.

3. An anchor according to claim 1 wherein the groove extends completely across the flat front face of the end wall.

4. In combination with a metal backing and a ceramic lining overlying the backing and having at least one tapered hole which tapers downwardly toward the backing; an improved fastening device for securing the lining to the backing, said fastening device comprising: a tapered anchor having a large end and a small end and a tapered side wall between the two ends, with the side wall being concentric about the axis of the anchor, the side wall being seated against the tapered surface of the hole with its taper generally corresponding to the taper of the hole, the small end having an end face extending across it with the end face being generally flat and generally perpendicular to the axis, the end face being located adjacent to the backing, the anchor also having a aperture which opens out of the end face at the small end and when unoccupied exposes the backing from the large end of the anchor, the anchor at its small end further having a groove that opens out of the end face and toward the backing, the groove intersecting the aperture and extending from the aperture; and connecting means extending from the backing and into the aperture for securing the anchor firmly to the backing.

5. The combination according to claim 4 wherein the connecting means comprises a weld bead that is joined to both the backing and the small end of the anchor, the weld bead occupying at least a portion of the aperture as well as at least a portion of the groove.

6. The combination according to claim 4 wherein the groove radiates from two locations along the periphery of the aperture.

7. The combination according to claim 4 wherein the interior of the anchor is hollow and wider than the aperture and the hollow interior opens outwardly through the large diameter end of the tapered hole in the lining.

8. The combination according to claim 4 wherein the aperture is threaded; and wherein the connecting means comprises a threaded element attached to the backing and extended outwardly from it and into the aperture of the anchor, with the threads of the anchor and the threaded element being engaged.

9. The combination according to claim 8 wherein the side wall at its large diameter end has outwardly opening slots which may be engaged by a tool for turning the anchor.

10. The combination according to claim 8 wherein the threaded element is threaded stud that is welded at its one end to the backing.

11. The combination according to claim 8 wherein the threaded element is a machine screw that extends through the backing.

12. The combination according to claim 4 wherein the lining comprises a plurality of tiles set edge-to-edge with each tile having at least one tapered hole therein and being secured by a fastening device.

13. The combination according to claim 12 and further comprising a grout bed between the tiles and the backing.

* * * * *